United States Patent

Noll et al.

[11] Patent Number: 5,913,331
[45] Date of Patent: Jun. 22, 1999

[54] CHECK VALVE

[75] Inventors: Brad L. Noll; Kirk A. Johnson, both of Atascadero; Timothy W. Hurt, Paso Robles, all of Calif.

[73] Assignee: Zurn Industries, Inc., Paso Robles, Calif.

[21] Appl. No.: 09/104,046

[22] Filed: Jun. 24, 1998

Related U.S. Application Data

[60] Provisional application No. 60/050,694, Jun. 25, 1997.

[51] Int. Cl.$^6$ .............................. F16K 15/00; F16K 31/00
[52] U.S. Cl. ............................................ 137/535; 251/337
[58] Field of Search .................................. 137/53.5, 528; 251/337, 336

[56] References Cited

U.S. PATENT DOCUMENTS

| | | | |
|---|---|---|---|
| 1,278,133 | 9/1918 | Gammeter | 137/535 |
| 2,244,373 | 6/1941 | Powers | 137/535 |
| 2,332,604 | 10/1943 | Roth et al. | 137/535 |
| 3,895,647 | 7/1975 | Willenbrock et al. | 137/535 |
| 4,109,819 | 8/1978 | Kushman et al. | 137/535 |
| 4,298,023 | 11/1981 | McGinnis | 137/535 |
| 4,357,954 | 11/1982 | Hunter | 137/535 |

*Primary Examiner*—Denise L. Ferensic
*Assistant Examiner*—Joanne Y. Kim
*Attorney, Agent, or Firm*—Webb Ziesenheim Logsdon Orkin & Hanson, P.C.

[57] ABSTRACT

A check valve for preventing backflow in a conduit. The check valve includes a check valve mechanism having a valve seat defining an opening for fluid flow, a seal retainer positioned downstream of the valve seat and configured to seal the opening and a linkage between the valve seat and seal retainer. The linkage permits guided axial displacement between the valve seat and the seal retainer. The linkage also provides a retention force urging the seal retainer into engagement with the valve seat and creating a fluid seal therebetween when a downstream flow in the opening is insufficient to overcome the retention force provided by the linkage.

20 Claims, 3 Drawing Sheets

CHECK VALVE

CROSS REFERENCE TO RELATED APPLICATION

This application claims the benefit of U.S. Provisional application Ser. No. 60/050,694 filed Jun. 25, 1997, entitled "Backflow Preventer Check Valve Assembly".

BACKGROUND OF THE INVENTION

1. Field of the Invention

The present invention relates to valves for use with fluid systems and particularly to a center guided check valve.

2. Description of the Prior Art

An ongoing challenge in the design of backflow check valves is to meet all applicable industry standards while maintaining the lowest possible pressure loss through the valve. Heretofore, manufacturers of check valves have designed and manufactured check valves that include a center guide urged to a closed position by a compression spring. While this design is very reliable, there is greater pressure loss across the valve because of the direct load imposed by the spring. Some manufacturers have attempted to reduce pressure drop by using a flapper-style check valve design having a spring to urge the flapper to a closed position. This design has proven unreliable due to the lack of precision in guiding the check valve to the seat. In an effort to mechanically reduce the spring load, a single torsion spring has been used in conjunction with the flapper-type check valve. This design provides reduced pressure loss through the valve but suffers the same reliability problems as other flapper-type check valve designs.

It is an object of the present invention to provide a check valve that overcomes the disadvantages present in these prior art check valves.

It is a specific object of the present invention to provide a check valve in which the spring load on the valve seal in the open position does not cause significant pressure loss across the valve.

SUMMARY OF THE INVENTION

The above objects are satisfied with a check valve made in accordance with the present invention. Generally, the check valve includes a check valve mechanism secured within a check valve body. The check valve body includes a body interior wall spaced away from a central longitudinal axis. The check valve mechanism may be removable from the check valve body or be integrally formed as part of the check valve body. Additionally, the check valve mechanism can be used in a conduit, such as a pipe, which forms the body of the check valve mechanism.

The check valve mechanism permits downstream fluid flow in a conduit such as a pipe. The check valve mechanism includes a valve seat having an interior wall extending therethrough defining an opening for fluid flow. A seal retainer is positioned adjacent to the valve seat and is configured to seal the opening. The valve seat includes a downstream face having a raised lip surrounding the opening. The seal retainer has an upstream face having a seal ring mounted thereon which contacts the raised lip to create a fluid seal between the valve seat and the seal retainer. A linkage between the valve seat and the seal retainer permits displacement between the valve seat and the seal retainer. The linkage includes a stem extending between the valve seat and the seal retainer permitting limited axial displacement between the valve seat and the seal retainer.

The linkage also includes at least two arms extending between the valve seat and the seal retainer. The arms each preferably have a first end pivotally mounted to the seal retainer and a second end contacting the interior wall of the valve seat. The arms are preferably resiliently biased to provide a retention force urging the seal retainer into engagement with the valve seat to create a fluid seal therebetween when the downstream fluid flow in the opening is insufficient to overcome the retention force provided by the arms.

The interior wall of the valve seat preferably has a first peripheral surface and a second peripheral surface. The second end of each of the arms preferably contacts the first peripheral surface and the second peripheral surface of the interior wall of the valve seat. The arms preferably provide a greater retention force when the second end of each of the arms is in contact with the second peripheral surface than when in contact with the first peripheral surface. A torsion spring can be provided at the first end of each of the arms to provide the retention force to the arms. The second end of each of the arms can have a roller which contacts the interior wall of the valve seat.

DETAILED DESCRIPTION OF THE EMBODIMENT

Figure 1:
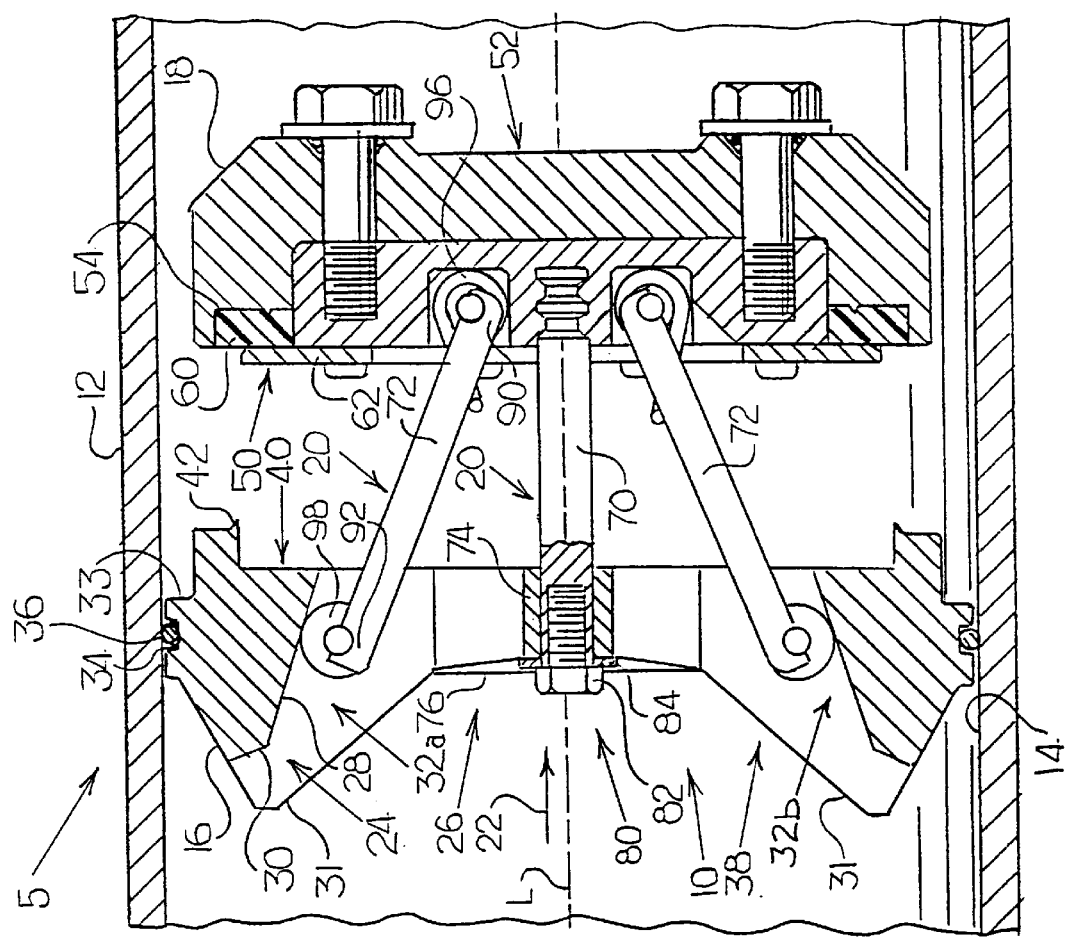
FIG. 1 is a sectional view of the check valve made in accordance with the present invention in an open position.
Figure 2:
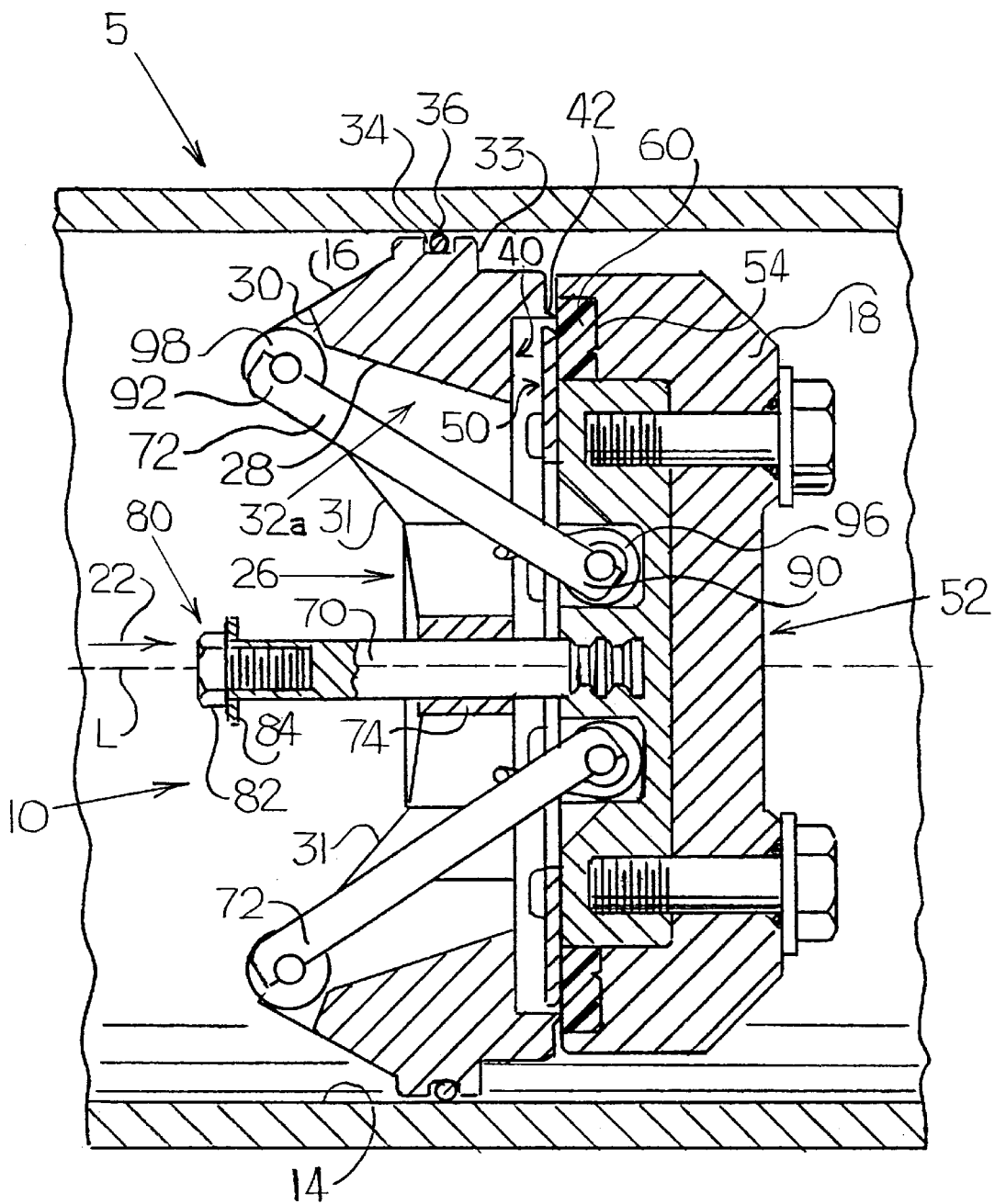
FIG. 2 is a sectional view of the check valve made in accordance with the present invention in a closed position.

FIGS. 1–2 illustrate a backflow prevention device or check valve 5 made in accordance with the present invention. The following discussion is with reference to the check valve 5 having a check valve mechanism 10 and a check valve body 12. The check valve body 12 can be mounted within a conduit such as a pipe (not shown). The check valve mechanism 10, as illustrated in FIGS. 1 and 2, is removable from the check valve body 12. In an alternative embodiment, the check valve mechanism 10 may be integrally formed with the check valve body 12.

It will also be apparent that the check valve mechanism 10 may be used in a conduit, such as a pipe, and removably positioned therein or integrally formed with the pipe. In either configuration, the conduit forms a body of the check valve mechanism 10.

Referring to FIGS. 1 and 2, the check valve body 12 includes a body interior wall 14, or inner surface, spaced from a central longitudinal axis L. The check valve mechanism 10 generally includes a valve seat 16, a seal retainer 18 and a linkage 20 extending between the valve seat 16 and the seal retainer 18. The check valve mechanism 10 is symmetric about the central longitudinal axis L of the check valve body 12 and the components in the upper half of FIG. 1 will be discussed with the understanding that identical components exist in mirror image in the lower half of FIG. 1. A direction of fluid flow in the check valve body 12 is identified by arrow 22.

The valve seat 16 has an interior wall 24 which defines an opening 26 through which fluid may flow. The interior wall 24 includes a first peripheral surface 28 extending in a longitudinal direction and a second peripheral surface 30 also extending in a longitudinal direction and positioned adjacent and upstream of the first peripheral surface 28. The first peripheral surface 28 and the second peripheral surface 30 each taper inwardly toward the central longitudinal axis L of the check valve body 12 in the direction of fluid flow 22. The second peripheral surface 30 tapers more steeply towards the central longitudinal axis L of the check valve body 12 than the first peripheral surface 28. A pair of opposing substantially parallel slot walls 31, one of which is shown in FIGS. 1 and 2, extend from the first peripheral surface 28 and the second peripheral surface 30 to the opening 26 and define a slot 32a therebetween. A similar pair of slot walls 31 defines a second slot 32b. Since these slots are identical, subsequent reference to them will be to slot 32. The peripheral surface of each slot 32 is made up of the first peripheral surface 28 and the second peripheral surface 30. In FIGS. 1 and 2 only one of the pair of slot walls 31 is illustrated because FIGS. 1 and 2 are sectional views taken along a plane passing between the pair of slot walls 31.

The valve seat 16 includes a periphery 33 which conforms to the body interior wall 14 of the check valve body 12. The periphery 33 defines a groove 34 having an elastic ring 36 positioned therein. The elastic ring 36 conforms to and presses against the body interior wall 14 to create a fluid seal between the valve seat 16 and the body interior wall 14. The valve seat 16 has an upstream face 38 and a downstream face 40. The downstream face 40 includes a raised lip 42 surrounding the opening 26.

FIGS. 1–2 illustrate an embodiment of the invention in which the elastic ring 36 is mounted in the groove 34 which is part of a circular periphery 33 of the valve seat 16. In this embodiment, the check valve mechanism 10 may be removed from the check valve body 12 for visual inspection. In an alternative embodiment, the periphery 33 may be formed as an integral part of the check valve body 12.

The seal retainer 18 includes an upstream face 50 and a downstream face 52. The upstream face 50 of the seal retainer 18 faces the downstream face 40 of the valve seat 16. The seal retainer 18 is configured to seal the opening 26. The upstream face 50 defines a circular groove 54 which has a seal ring 60 mounted thereon. The seal ring 60 is held in place on the upstream face 50 by a retainer plate 62. The circular groove 54 and the seal ring 60 are positioned on the upstream face 50 so that the sealing ring 60 is positioned substantially opposite from the raised lip 42 on the downstream face 40 of the valve seat 16.

The linkage 20 permits the seal retainer 18 to move relative to the valve seat 16. The linkage 20 provides guided axial displacement between the seal retainer 18 and the valve seat 16 and provides a retention force which urges the seal retainer 18 into engagement with the valve seat 16. The linkage 20 includes a stem 70 and at least two arms 72.

The stem 70 is attached at one end to the seal retainer 18 and generally protrudes from the seal retainer 18 into the opening 26 defined by the interior wall 24 of the valve seat 16. A sleeve 74 is mounted in the opening 26 and includes at least one, but preferably has a plurality of radially extending spokes 76. The spokes 76 are attached to the slot walls 31 extending from the first peripheral surface 28 and the second peripheral surface 30. The stem 70 slidably extends through the sleeve 74. The sleeve 74 permits axial motion of the stem 70, but limits radial motion. The axial motion of the stem 70 is limited by a restrictor 80 located at the end of the stem 70 protruding into the opening 26. Thus, the axial displacement between the seal retainer 18 and the valve seat 16 is also restricted. The restrictor 80 is shown in FIG. 1 as a bolt 82 and washer 84, but any similar device that can limit the axial displacement between the seal retainer 18 and the valve seat 16 can be used in place of the bolt 82 and washer 84.

In an alternative embodiment, the stem 70 may be attached to the valve seat 16 and the sleeve 74 attached to the seal retainer 18. The stem 70 is still slidably received within the sleeve 74 as discussed above.

The linkage 20 further includes at least two arms 72 each having a first end 90 and a second end 92. The first end 90 of each of the arms 72 is pivotally attached to the seal retainer 18. The second end 92 of each of the arms 72 extends into the opening 26. The first end 90 of each of the arms 72 includes a torsion spring 96 and the second end 92 of each of the arms 72 includes a roller 98. The rollers 98 freely rotate at the second end 92 of each of the arms 72. The torsion springs 96 at the first end 90 of each of the arms 72 resiliently bias each of the arms 72 so that the arms 72 pivot outwardly in the opening 26 away from the central longitudinal axis L of the check valve body 12. The rollers 98 contact the interior wall 24 at the first peripheral surface 28 and the second peripheral surface 30. The rollers 98, due to the retention force provided by the torsion springs 96, exert a retention force against the first peripheral surface 28 and the second peripheral surface 30 thereby urging the seal retainer 18 toward the valve seat 16.

Figure 4:
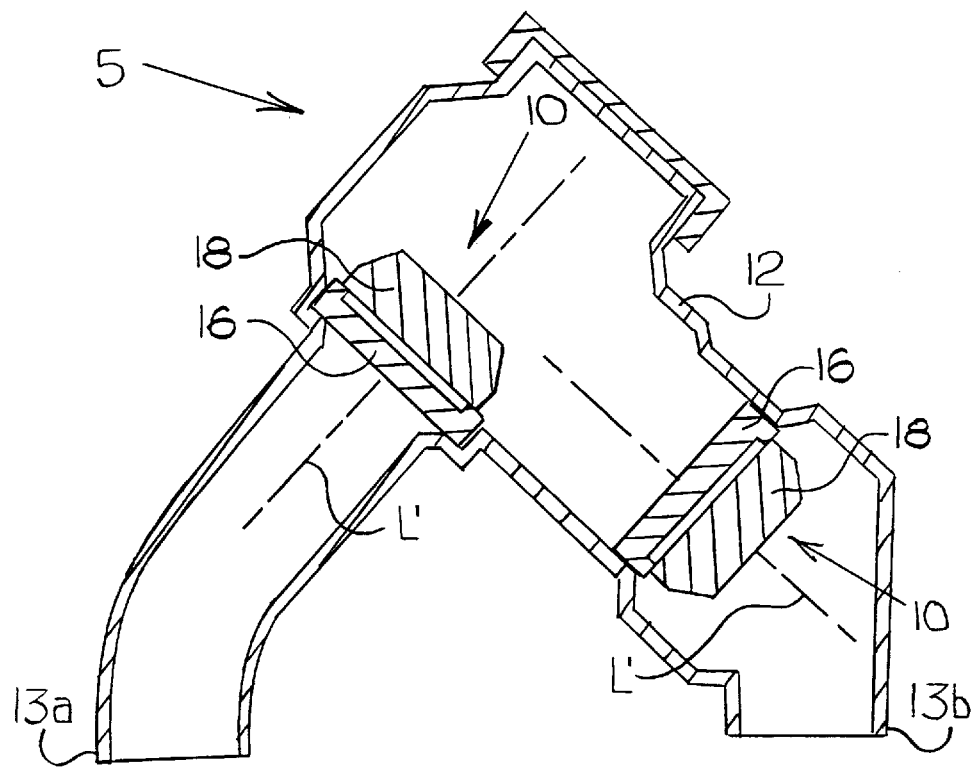
FIG. 4 is a sectional view of the check valve made in accordance with the present invention schematically showing two offset check valve mechanisms.
Figure 3:
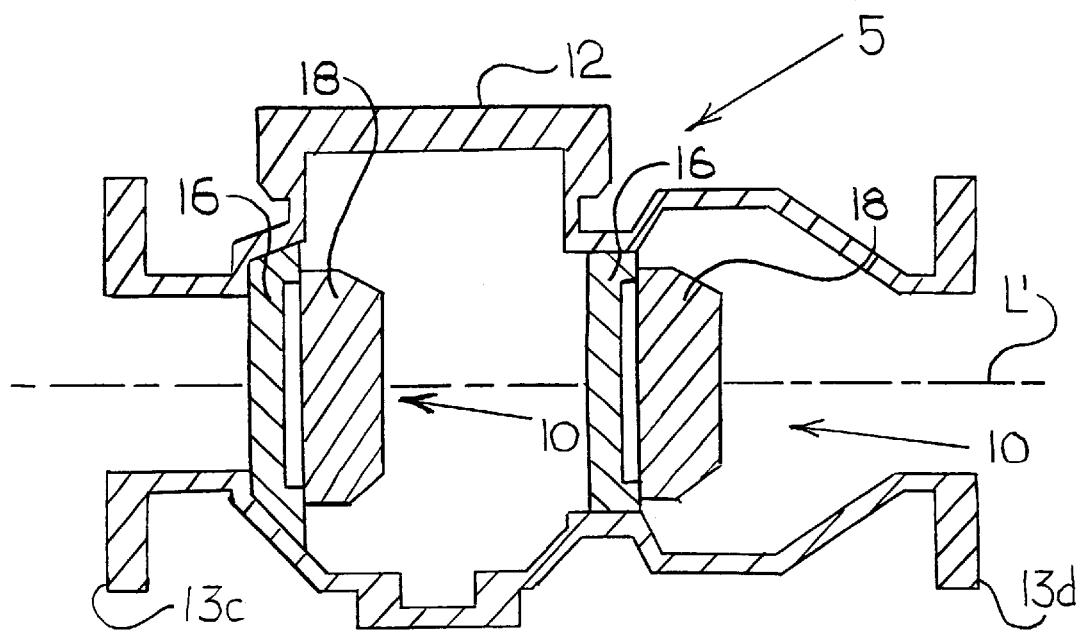
FIG. 3 is a sectional view of the check valve made in accordance with the present invention schematically showing two in-line check valve mechanisms.

Additionally, as shown in FIGS. 3 and 4, more than one check valve mechanism may be positioned within the check valve body 12. FIGS. 3 and 4 show two typical embodiments of the check valve 5 made in accordance with the present invention. FIG. 3 shows the check valve 5 having two check valve mechanisms 10, shown schematically, in an in-line configuration and sharing a common longitudinal axis L'. The check valve body 12 may be connected to a conduit, such as a pipe (not shown). FIG. 4 shows the check valve 5 having two check valve mechanisms 10, shown schematically, in an offset configuration and received within the check valve body 12. The check valve mechanisms 10 illustrated in FIG. 4 have central longitudinal axes L' which are substantially transverse to one another, but it is envisioned that the check valve mechanisms 10 can be arranged at any angle relative to one another. It is also possible to utilize a single check valve mechanism 10 within the check valve body 12. The check valve body 12 may be connected to adjacent conduit by grooved pipe couplings 13a, 13b illustrated in FIG. 4 to the conduit, by securing the flanges 13c, 13d illustrated in FIG. 3 to mating flanges on the conduit, or by any other means for connecting conduit known to those skilled in the art.

Referring to FIGS. 1 and 2, operation of the check valve mechanism 10 will now be discussed. FIG. 1 shows the check valve mechanism 10 in an open position in which the seal retainer 18 is spaced away from the valve seat 16. When flow in the direction of the arrow 22 is encountered which is sufficient to overcome the retention force provided by the arms 72, the seal retainer 18 begins to separate from the valve seat 16 in the direction of fluid flow 22. Fluid may flow through the opening 26 in the direction of fluid flow 22 in the check valve body 12 and around the seal retainer 18. FIG. 2 shows the check valve mechanism 10 in a closed position in which the seal retainer 18 engages the valve seat 16 so that flow through the check valve mechanism 10 is prevented in the direction opposite to the direction of fluid flow 22.

Referring first to FIG. 2, the check valve mechanism 10 is in the closed position in which the seal retainer 18 is in engagement with the valve seat 16. The rollers 98 at the second end 92 of each of the arms 72 are in contact with the second peripheral surface 30. The stem 70 projects through the sleeve 74 and into the opening 26. The downstream face 40 of the valve seat 16 faces the upstream face 50 of the seal retainer 18. The raised lip 42 engages the seal ring 60 so that a fluid tight seal exists between the valve seat 16 and the seal retainer 18. The elastic ring 36 positioned in the groove 34 conforms to and presses against the body interior wall 14 and provides a fluid tight seal between the valve seat 16 and the body interior wall 14. The torsion spring 96 at the first end 90 of each of the arms 72 biases the second end 92 of each of the arms 72 outwardly in the opening 26 so that each of the rollers 98 contacts and exerts a retention force on the second peripheral surface 30. The torsion springs 96 provide the retention force to the arms 72. The arms 72 thereby urge the seal retainer 18 into engagement with the valve seat 16.

In the closed position, the retention force provided by the arms 72 is greater because the rollers 98 are in contact with the second peripheral surface 30 which has a steeper taper. The steeper taper of the second peripheral surface 30 relative to the first peripheral surface 28 toward the central longitudinal axis L of the check valve body 12 generates a greater retention force on the seal retainer 18. This provides a relatively high closing force for the check valve mechanism 10, which causes the seal retainer 18 to quickly come into engagement with the valve seat 16 when this relatively high closing force is encountered.

In the open position, as shown in FIG. 1, the rollers 98 contact the first peripheral surface 28, which has a relatively shallow taper relative to the central longitudinal axis L and the retention force on the seal retainer 18 is low. Therefore, the retention force provided by the arms 72 is at a maximum when the rollers 98 are in contact with the second peripheral surface 30. The seal retainer 18 will remain in engagement with the valve seat 16 and the check valve mechanism 10 will remain in the closed position until this maximum retention force is overcome in the direction of fluid flow 22.

Referring now to FIG. 1, when flow in the direction of the arrow 22 is encountered which is sufficient to overcome the maximum retention force, the seal retainer 18 begins to move away from the valve seat 16. The rollers 98 move along the second peripheral surface 30. The stem 70 moves in the sleeve 74 in the direction of fluid flow 22. The raised lip 42 is spaced away from the seal ring 60. Fluid may now flow first through the opening 26 and then around the seal retainer 18. As the seal retainer 18 continues to move away from the valve seat 16, the rollers 98 move past the second peripheral surface 30 and begin to contact the first peripheral surface 28. The retention force provided by the arms 72 urging the seal retainer 18 toward the valve seat 16 is reduced due to the relatively shallow taper of the first peripheral surface 28. Thus, when the rollers 98 are in contact with the first peripheral surface 28, the fluid flow in the direction indicated by the arrow 22 necessary to separate the seal retainer 18 from the valve seat 16 is relatively low.

The rollers 98 will continue to move along the first peripheral surface 28 and the seal retainer 18 will continue to move away from the valve seat 16 until the restrictor 80 stops the axial displacement of the seal retainer 18 relative to the valve seat 16. The bolt 82 and washer 84 abut against the sleeve 74 thereby limiting the axial displacement of the seal retainer 18 from the valve seat 16.

When the flow in the direction of the arrow 22 is reduced to a point where it cannot overcome the retention force provided by the arms 72, or when flow in the opposite direction (upstream flow) is encountered, the process described above occurs in reverse. The seal retainer 18 moves toward and abuts the valve seat 16 thereby covering the opening 26 and preventing reverse flow through the opening 26.

Although this invention has been described with reference to a preferred embodiment, obvious modifications and alterations of the invention may be made without departing from the spirit and scope of the invention. The scope of the present invention is defined by the appended claims and equivalents thereto.

We claim:

1. A check valve permitting downstream fluid flow, comprising:
    a) a check valve body; and
    b) at least one check valve mechanism mounted within the check valve body, wherein the check valve mechanism comprises:
        a valve seat having an interior wall extending therethrough, the interior wall defining an opening for fluid flow;
        a seal retainer positioned adjacent to the valve seat and configured to seal the opening; and
        a linkage between the valve seat and the seal retainer permitting displacement between the valve seat and the seal retainer, wherein the linkage has at least two arms mounted to the seal retainer and extending between the valve seat and seal retainer, wherein the at least two arms are resiliently biased to provide a retention force urging the seal retainer against the valve seat to create a fluid seal therebetween when the downstream fluid flow in the opening is insufficient to overcome the retention force provided by the at least two arms.

2. The check valve of claim 1, wherein the at least two arms each have a first end pivotally mounted to the seal retainer and a second end extending into the opening, wherein the interior wall defining the opening tapers inwardly in the downstream direction and wherein the second end of each of the at least two arms is resiliently biased against the interior wall so that the valve seat and the seal retainer are urged together.

3. The check valve of claim 2, wherein each of the at least two arms has a roller at the second end.

4. The check valve of claim 2, wherein:
    a) the interior wall of the valve seat comprises:
        i) a first peripheral surface extending in a longitudinal direction; and
        ii) a second peripheral surface extending in a longitudinal direction and positioned adjacent to and downstream of the first peripheral surface,
    b) wherein the first peripheral surface and the second peripheral surface each taper inwardly in the opening toward a central longitudinal axis of the check valve body, and
    c) wherein the second peripheral surface tapers more steeply toward the central longitudinal axis of the check valve body than the first peripheral surface.

5. The check valve of claim 4, wherein the at least two arms provide a greater retention force when the second end of each of the at least two arms is in contact with the second peripheral surface than when in contact with the first peripheral surface.

6. The check valve of claim 1, wherein each of the at least two arms is resiliently biased by a torsion spring.

7. The check valve of claim 1, wherein the linkage further includes a stem extending between the valve seat and the seal retainer permitting limited axial displacement between the valve seat and the seal retainer.

8. The check valve of claim 7 further including a sleeve mounted in the opening with the stem extending therethrough and a restrictor at the end of the stem to limit axial displacement.

9. The check valve of claim 1, wherein:
a) the valve seat has a raised lip surrounding the opening on a downstream face opposite the seal retainer, and
b) the seal retainer includes an upstream face positioned opposite the valve seat and having a seal ring mounted thereon which contacts the raised lip to create a fluid seal between the valve seat and the seal retainer.

10. The check valve of claim 1 further including a plurality of check valve mechanisms mounted within the check valve body.

11. A check valve mechanism for mounting in a check valve body permitting downstream flow, comprising:
a valve seat having an interior wall extending therethrough, the interior wall defining an opening for fluid flow;
a seal retainer positioned adjacent to the valve seat and configured to seal the opening; and
a linkage between the valve seat and the seal retainer permitting displacement between the valve seat and the seal retainer, wherein the linkage has at least two arms mounted to the seal retainer and extending between the valve seat and the seal retainer, wherein the at least two arms are resiliently biased to provide a retention force urging the seal retainer against the valve seat to create a fluid seal therebetween when the downstream fluid flow in the opening is insufficient to overcome the retention force provided by the at least two arms.

12. The check valve of claim 11, wherein the at least two arms each have a first end pivotally mounted to the seal retainer and a second end extending into the opening, wherein the interior wall defining the opening tapers inwardly in the downstream direction and wherein the second end of each of the at least two arms is resiliently biased against the interior wall so that the valve seat and the seal retainer are urged together.

13. The check valve of claim 12, wherein each of the at least two arms has a roller at the second end.

14. The check valve of claim 12, wherein:
a) the interior wall of the valve seat comprises:
  i) a first peripheral surface extending in a longitudinal direction; and
  ii) a second peripheral surface extending in a longitudinal direction and positioned adjacent to and downstream of the first peripheral surface,
b) wherein the first peripheral surface and the second peripheral surface each taper inwardly in the opening toward a central longitudinal axis of the check valve body, and
c) wherein the second peripheral surface tapers more steeply toward the central longitudinal axis of the check valve body than the first peripheral surface.

15. The check valve of claim 14, wherein the at least two arms provide a greater retention force when the second end of each of the at least two arms is in contact with the second peripheral surface than when in contact with the first peripheral surface.

16. The check valve of claim 12, wherein:
a) the valve seat has a raised lip surrounding the opening on a downstream face opposite the seal retainer, and
b) the seal retainer includes an upstream face positioned opposite the valve seat and having a seal ring mounted thereon which contacts the raised lip to create a fluid seal between the valve seat and the seal retainer.

17. The check valve of claim 11, wherein each of the at least two arms is resiliently biased by a torsion spring.

18. The check valve of claim 11, wherein the linkage further includes a stem extending between the valve seat and the seal retainer permitting limited axial displacement between the valve seat and seal retainer.

19. The check valve of claim 17, further including a sleeve mounted in the opening with the stem extending therethrough and a restrictor at the end of the stem to limit axial displacement.

20. A check valve permitting downstream fluid flow, comprising:
a) a check valve body; and
b) at least one check valve mechanism received within the check valve body, wherein the at least one check valve mechanism further comprises:
  a valve seat having an interior wall extending therethrough defining an opening for fluid flow;
  a seal retainer positioned downstream of the valve seat and configured to seal the opening;
  a stem extending between the valve seat and the seal retainer permitting limited axial displacement between the valve seat and the seal retainer; and
  at least two arms extending between the valve seat and the seal retainer, the at least two arms each having a first end pivotally mounted to the seal retainer and a second end contacting the interior wall of the valve seat, wherein the at least two arms are resiliently biased to provide a retention force urging the seal retainer against the valve seat to create a fluid seal therebetween when the downstream fluid flow in the opening is insufficient to overcome the retention force provided by the at least two arms.

* * * * *

UNITED STATES PATENT AND TRADEMARK OFFICE
CERTIFICATE OF CORRECTION

PATENT NO. : 5,913,331
DATED : June 22, 1999
INVENTOR(S) : Brad L. Noll et al.

It is certified that error appears in the above-identified patent and that said Letters Patent is hereby corrected as shown below:

Title Page, under [56] References Cited, insert:
--OTHER REFERENCES
Orion Backflow Preventers 3" Double Check Model BDC, 10/1/80, 8 pp.--.

Claim 12 Column 7 Line 33 after "valve" insert --mechanism--.

Claim 13 Column 7 Line 41 after "valve" insert --mechanism--.

Claim 14. Column 7 Line 43 after "valve" insert --mechanism--.

Claim 15 Column 8 Line 4 after "valve" insert --mechanism--.

Claim 16 Column 8 Line 9 after "valve" insert --mechanism--.

Claim 17 Column 8 Line 17 after "valve" insert --mechanism--.

Claim 18 Column 8 Line 19 after "valve" insert --mechanism--.

Claim 19 Column 8 Line 24 after "valve" insert --mechanism--.

Claim 19 Column 8 Line 24 "of claim 17" should read --of claim 18--.

Signed and Sealed this

Fourteenth Day of December, 1999

Attest:

Q. TODD DICKINSON

*Attesting Officer*     *Acting Commissioner of Patents and Trademarks*